June 22, 1954
J. J. PARKER ET AL
2,681,805
CHUCK FOR HOLDING SPLINED WORKPIECES
Filed Nov. 14, 1951
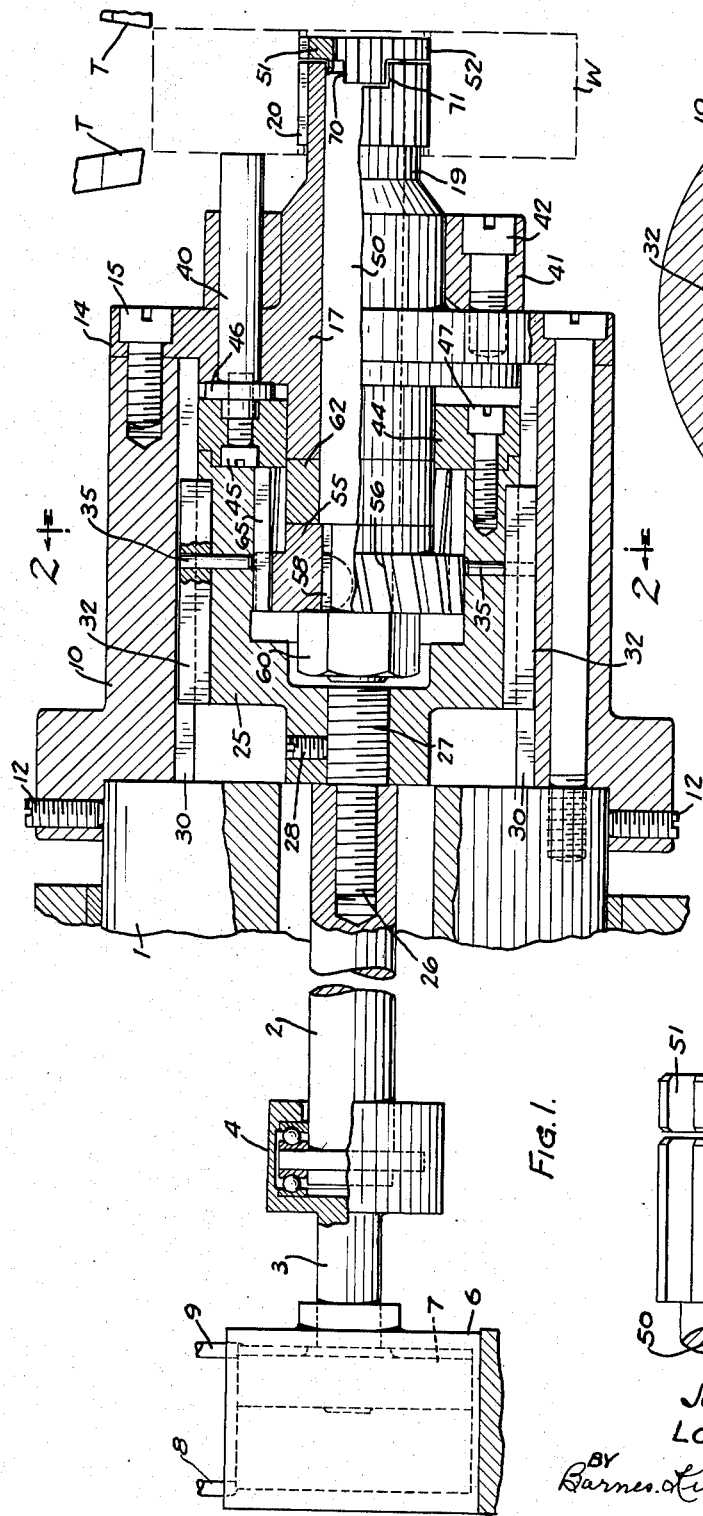
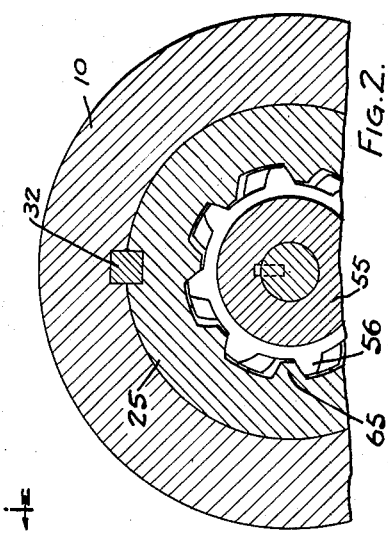
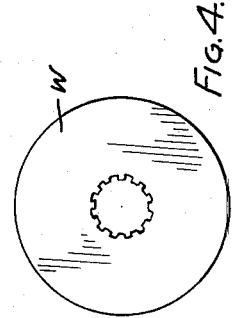
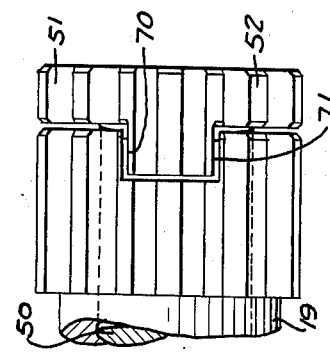
INVENTORS
JOHN J. PARKER &
LONDON T. MORAWSKI
BY
Barnes, Kisselle, Laughlin & Raisch
ATTORNEYS.

Patented June 22, 1954

2,681,805

UNITED STATES PATENT OFFICE 2,681,805

CHUCK FOR HOLDING SPLINED WORKPIECES

John J. Parker and London T. Morawski, Detroit, Mich.

Application November 14, 1951, Serial No. 256,291

5 Claims. (Cl. 279—1)

This invention relates to a chuck or work holder for holding a work piece which has a toothed or splined formation thereon.

An example of the work piece in question is a gear blank formed with a central aperture therein and which aperture is splined so that it may fit upon a splined shaft. The object of the invention is to provide an improved chuck or holder for holding such a blank so that it may be rotated and machine operations performed thereon. By holding the work blank from its splined formation, the machine operations performed thereon are accurately performed relative to the splined formation. The invention aims to provide a rotatable holder so arranged and constructed that the work blank may be easily placed thereon and removed therefrom and so that the gripping portions of the chuck will remain in such approximate alignment, or in proximity to each other, that the work piece may be readily mounted thereon. A chuck or holder made in accordance with the invention is disclosed in the accompanying drawings:

Fig. 1 is a view largely in cross section showing the chuck mounted upon the rotary element of a machine tool, and illustrating some parts diagrammatically and showing the work in dotted lines.

Fig. 2 is a cross sectional view taken substantially on line 2—2 of Fig. 1.

Fig. 3 is an enlarged detail view showing the work gripping elements.

Fig. 4 is an elevational view of a work piece which may be held by the chuck.

A rotary element, such as the spindle head of a machine tool is illustrated at 1. The operating mechanism for the chuck may include a rod 2 connected to a piston rod 3 through the means of a connection or joint 4 which will permit the rod 2 to rotate relative to the piston rod 3 but which joint will transmit axial forces to cause axial movement of the rod 2. Suitable operating means is shown as in the form of a cylinder 6 with a piston 7 therein connected to the piston rod 3 and with conduits 8 and 9 leading to opposite ends of the cylinder. When a hydraulic medium or compressed air is introduced into one end of the cylinder and exhausted from the other, the piston is caused to move in a manner well appreciated. The chuck has a body portion 10 which may be mounted upon the spindle head 1, by means of bolts 11 and it may be centered by set screws or the like 12. An end piece 14 is secured to the body as by means of cap screws 15. This end piece has a hub portion 17. A projecting element 19 of the end piece 14 is provided with teeth or splines, as illustrated at 20. These teeth or splines may be integrally formed thereupon.

A shiftable inner member 25 is connected to the rod 2 as by means of a threaded stud having a portion 26 threaded into the rod 2 and a portion 27 threaded into the inner member 25 and held located by a set screw 28. The body 10 is provided with a keyway 30 and the inner member 25 is slidably keyed thereto by a key 32 and the key may be held fixed on the member 25 by pins 35. More than one key may be employed if desired.

A locator pin 40 is slidably mounted in the end piece 14 and guided by an end element 41 secured to the end piece 14 by cap screws 42. This locator pin is attached to a ring 44 by means of a screw 45 and the locator pin may have a flange or head 46 so that when the screw 45 is tightened, the head 46 engages one side of the ring and the head of the screw engages the opposite side of the ring. The ring 44 is mounted on the inner member 25 by means of screws 47.

Journalled within the hub 17 of the end plate 14 is what may be termed a shaft 50 having an end section 51 with teeth or splines 52 thereon. Mounted on this shaft is a member 55 with external helical teeth 56, the member being keyed to the shaft as at 58 and held tightened in position by a nut 60 screw threaded on the end of the shaft 50. A spacer ring or bearing 62 is positioned between the hub 17 and a splined element 55.

The member 25 is of hollow form, and it is provided with elongated helical internal splines 65. The splines 56 and 65 interengage each other, as shown in Fig. 2. These splines are loosely engaged because the spacing between each tooth of the splined formation is considerably wider than the width of the tooth.

It will, accordingly, be observed that there is some considerable relative rotation permitted between the body 25 and the splined element 55 and, therefore, the shaft 50. The relationship of the parts, as shown in Fig. 1, is such that the work piece, as shown at W, may be placed upon or removed from the work holding elements 19 and 51. In this relationship, the inner member 25 is retracted to the right within the body member 10 and, in fact, the flange 46 of the locating pin 40 is abutted against the inner surface of the end plate 14. Thus, the locator pin is accurately positioned. Because of the looseness of the engagement of the splines 65 and 56, the shaft 50 may be rocked relative to the end plate 14, thus relatively rocking the teeth 20 and 52.

However, it is the purpose of the invention to prevent too much disalignment of the teeth 20 and 52 and, therefore, the element 19 and the element 51 have interengaging parts constituted by a projecting portion 70 on the member 51, which engages loosely in a recess 71 in the member 19. At this location the tooth or teeth 52 on the member 51 are elongated to the extent of the projection 70 and the corresponding teeth on the member 19 is correspondingly shortened. Therefore, the relative rotary movement of the splined teeth 20 and 52 is limited by the slight clearances of the projection 70 in the recess 71, which is less than the relative rotary movement permitted between the shaft 50 and the inner member 25.

With the parts in this position, the work piece W may be easily applied to the splines 20 and 52, and if the splines 20 and 52 are slightly disaligned a slight rocking motion of the work piece will bring the same into alignment so that the work piece may be pushed into position against the locating pin 40. With the work piece in this position, fluid is entered into the cylinder 6 and the inner body 25 pulled axially to the left as Fig. 1 is viewed. In this action, the element 25 moves slightly axially without rotary motion relative to the body 10, and ultimately the helical splines 65 come into engagement with the splines 56 and thus rock the shaft 50. This rocks the teeth 52 relative to the teeth 20. Only a very slight relative rocking of the splined teeth 20 and 52 is needed, because these teeth accurately fit the internal spline formation of the work piece. The situation may be visualized as tightening of the teeth 20 and 52 upon the work piece. The work piece is now held in position for rotary movement by the spindle head 1 and machine operations may be performed thereon. In Fig. 1, cutting tools are shown at T. And these may be caused to engage the work piece simultaneously or individually as desired. The work piece is thus accurately centralized relative to its own internal splines or teeth. Therefore, the machine operations are accurate relative to the splines or teeth of the work piece. Moreover, the holder is admirably adapted for what is known as straddle-facing where two cutting tools, as shown at T in Fig. 1, are applied simultaneously to opposite faces of the work. The faces of the work overhang the teeth 20 and 52 and, therefore, the work piece may be machined throughout the entire area of both faces, the holding teeth 20 and 52 not interfering with the cutting tools.

It is, of course, within the invention to employ more than one locator pin 40 and more than one projection 70 and recess 71. When the work piece is thus gripped for operation thereon, the locator pin shifts to the left with the inner member 25 and, therefore, moves out of the way of any tool applied to the work piece.

After the operations have been performed on the work piece, the inner member is shifted back to the position shown in Fig. 1. Thus the teeth 20 and 52 no longer grip the work piece and it may be removed and another one applied.

We claim:

1. A chuck for holding a work piece having a splined formation so that machine operations may be performed thereon and having a body member with means so that it may be mounted upon a spindle of a machine tool, said chuck comprising, a work holding element carried by the body member, said element having one series of teeth thereon, another member rockably mounted in the body member, another work holding element carried by said other member and having teeth thereon, said other work holding element being disposed at one end of the chuck, the two elements being positioned in substantial alignment and adjacent each other so that the splined formation of the work piece may be mounted thereon, means for rocking the said other member relative to the body member to thereby relatively rock the teeth of said elements and cause the same to grip the splined formation on the work piece, and interengaging projection and recess means on said two work holding elements for limiting the relative rocking movement of the two work holding elements to hold the teeth thereon in general alignment so that a work piece may be readily applied thereto.

2. A chuck for holding a work piece having an internal splined formation so that machine operations may be performed thereon and having a body member with means so that it may be mounted upon a spindle of a machine tool, said chuck comprising, a work holding element carried by the body member, said element having one series of teeth thereon, another member rockably mounted in the body member, another work holding element carried by said other member and having teeth thereon, said other work holding element being disposed at one end of the chuck, the two elements being positioned in substantial alignment and adjacent each other so that the splined formation of the work piece may be mounted thereon, an inner member slidably keyed within the body member, said inner member having helical teeth thereon, said other member having helical teeth thereon, the helical teeth on the inner member and on said other member being in loose engagement providing for substantial rocking movement of said two elements relative to each other, means for axially shifting the inner member whereby the helical teeth engage each other and cause relative rocking movement of said two elements, and loosely engaging elements for limiting the relative rocking movement of said two elements.

3. A chuck for holding a work piece having a splined formation so that machine operations may be performed thereon and having a body member with means so that it may be mounted upon a spindle of the machine tool, said chuck comprising, a work holding element carried by the body member, said element having one series of teeth thereon, another member rockably mounted on the axis of the body member and having another work holding element with teeth thereon, said other work holding element being disposed at one end of the chuck, said work holding elements being positioned in close proximity so that the splined formation of the work piece may be mounted thereon, an inner member slidably keyed to the body member for axial movement, loosely engaging helical teeth on the inner member and said other member, means for shifting said inner member axially whereby the helical teeth engage each other to relatively rock the work holding elements and cause the teeth thereof to grip the spline formation on the work piece.

4. A chuck for holding a work piece having a splined formation so that machine operations may be performed thereon and having a body member with means so that it may be mounted upon a spindle of the machine tool, said chuck comprising, a work holding element carried by the body member, said element having one series of teeth thereon, another member rockably mounted on the axis of the body member and having another work holding element with teeth thereon, said other work holding element being disposed at one end of the chuck, said work holding elements being positioned in close proximity so that the splined formation of the work piece may be mounted thereon, an inner member slidably keyed to the body member for axial movement, loosely engaging helical teeth on the inner member and said other member, means for shifting said inner member axially whereby the helical teeth engage each other to relatively rock the work holding elements and cause the teeth thereof to grip the spline formation on the work piece, and a gauge element carried by the inner member for locating the work piece, said gauge element being shiftable out of position from the work piece by the aforesaid axial shift of the inner member.

5. A chuck for holding a work piece having a splined formation so that machine operations may be performed thereon and having a body member with means so that it may be mounted upon a spindle of the machine tool, said chuck comprising a work holding element carried by the body member, said element having one series of teeth thereon, another member rockably mounted on the axis of the body member and having another work holding element with teeth thereon, said other work holding element being disposed at one end of the chuck, said work holding elements being positioned in close proximity so that the splined formation of the work piece may be mounted thereon, an inner member slidably keyed to the body member for axial movement, loosely engaging helical teeth on the inner member and said other member, means for shifting said inner member axially whereby the helical teeth engage each other to relatively rock the work holding elements and cause the teeth thereof to grip the spline formation on the work piece, and loosely engaging key-type elements for limiting the rocking movement of the work holding elements relative to each other to an extent less than that afforded by the loosely engaging helical teeth.

References Cited in the file of this patent

UNITED STATES PATENTS

| Number | Name | Date |
|---|---|---|
| 1,600,367 | Sczawinski | Sept. 21, 1926 |
| 2,372,931 | Bregin | Apr. 3, 1945 |
| 2,445,184 | Parker et al. | July 13, 1948 |
| 2,555,496 | Mackmann | June 5, 1951 |